(12) United States Patent
Burns

(10) Patent No.: US 8,328,070 B1
(45) Date of Patent: Dec. 11, 2012

(54) WIRE HANDLING FACILITATOR

(75) Inventor: Thomas W. Burns, Grand Traverse, MI (US)

(73) Assignee: AltoTec Wire Corporation, Traverse City, MI (US)

( * ) Notice: Subject to any disclaimer, the term of this patent is extended or adjusted under 35 U.S.C. 154(b) by 0 days.

(21) Appl. No.: 13/371,662

(22) Filed: Feb. 13, 2012

(51) Int. Cl.
*B23K 1/00* (2006.01)

(52) U.S. Cl. ........................................ 228/41; 242/559.1

(58) Field of Classification Search ................ 228/41; 242/559.1
See application file for complete search history.

(56) References Cited

U.S. PATENT DOCUMENTS

| | | | | |
|---|---|---|---|---|
| 5,100,074 A | * | 3/1992 | Jones | 242/420.6 |
| 6,484,964 B1 | * | 11/2002 | Cooper | 242/559.1 |
| 7,427,726 B2 | * | 9/2008 | Enyedy et al. | 219/136 |
| 2012/0152924 A1 | * | 6/2012 | Christopher | 219/136 |

* cited by examiner

*Primary Examiner* — Nicholas D'Aniello
(74) *Attorney, Agent, or Firm* — Kacvinsky Daisak pllc

(57) ABSTRACT

A wire handling facilitator in the form of a backpack. An apparatus that is useful for handling small rolls of wire that is to be welded into channels of metal surfaces.

4 Claims, 2 Drawing Sheets

WIRE HANDLING FACILITATOR

BACKGROUND OF THE INVENTION

This invention deals with an apparatus that is useful for handling small segments of wire that is to be welded. Coiled wire is commercially packed, shipped and stored in a coiled configuration, most of the time using a storage container. However, this packed commercial wire is usually packed in large quantities, that is, many hundreds of feet which cannot be carried by any workman.

There exists equipment that is useful for handling large quantities of stored wire when used in a welding apparatus. Such equipment can be found in U.S. patent application Ser. No. 12/931,007, filed Jan. 21, 2011 in the name of Thomas W. Burns, the inventor in this patent application.

What is disclosed and claimed herein is a small device that allows one to carry a small quantity of wire along with the equipment to feed the wire into a welding apparatus.

In use for welding, where the wire is fed to a welding gun, the wire enters the gun through the rear of the gun and is subjected to electrical energy wherein it melts and is placed into channels in the metal to be welded to form a weld bead.

Even with small quantities of wire, if not controlled, the wire, upon leaving the tip of the welding gun, and before it is melted, typically bends in any given direction and does not lay into the channel to form the bead. Thus, one is forced to use very short segments of wire (which do not retain the cast of the coiled wire), or the wire is short enough that it can be hand bent to get rid of the wire cast and provide a straight piece of wire.

Even in longer segments, the wire, if not controlled, tends to re-coil, that is, attempts to resume its original cast, or bends out of linearity and causes disruptions in the equipment, which causes a disruption of the welding process and a possible shutdown of the equipment for repair. It also provides snarled and bent wire which is useless for re-use and is costly to replace.

THE INVENTION

Thus, what is disclosed and claimed herein is a wire handling facilitator in the form of a backpack. The wire handling facilitator comprises a housing having a front, a back, and a central wrap around side wall joining the back. The front is a hinged door.

Located and supported within the housing is a spool. The spool has a centered first axle having a distal end and a near end. The first axle is supported at the distal end by attachment to an inside back wall surface. The near end has detachedly attached to it, a spool retainer.

There is an alignment wheel mounted on a second axle, wherein a distal end of the second axle is fixedly attached to the inside back wall surface.

There is a brake pedal having a near end and a distal end wherein the near end has a first opening in it. The brake pedal is mounted on the second axle through the first opening, there being a second opening near the near end of the brake pedal.

The second opening has a near end of a tension spring detachedly attached to it, wherein the opposite end of the tension spring is detachedly attached to the wire handling facilitator housing nearby.

The alignment wheel is aligned to receive a wire from the spool in an outer groove of the alignment wheel. There is a wire drive puller and driver (drive rollers, drive wheels). The wire drive puller and driver is comprised of a housing having a front wall and a back wall.

There is a first opening in the front wall and a second opening in the back wall, each of the first opening and the second opening has a guide bushing inserted in it.

There is a set of two drive rollers each having a centered axle, and an outside circumference, the set of drive rollers being vertically aligned with the alignment wheel and the drive rollers are vertically aligned with each other. The drive rollers are in close proximity to each other at the respective outside circumferences. There is a means of controlling the drive roller tensions.

There is a set of two idler rollers each having a centered axle and an outside circumference wherein the set of idler rollers is aligned with the alignment wheel and vertically aligned with each other. The idler rollers are in close proximity to each other at the outside circumferences.

There is a means of controlling the speed of rotation of the drive rollers along with a drive motor attached to the drive rollers for powering and driving the drive rollers.

DETAILED DESCRIPTION OF THE INVENTION

Figure 1:
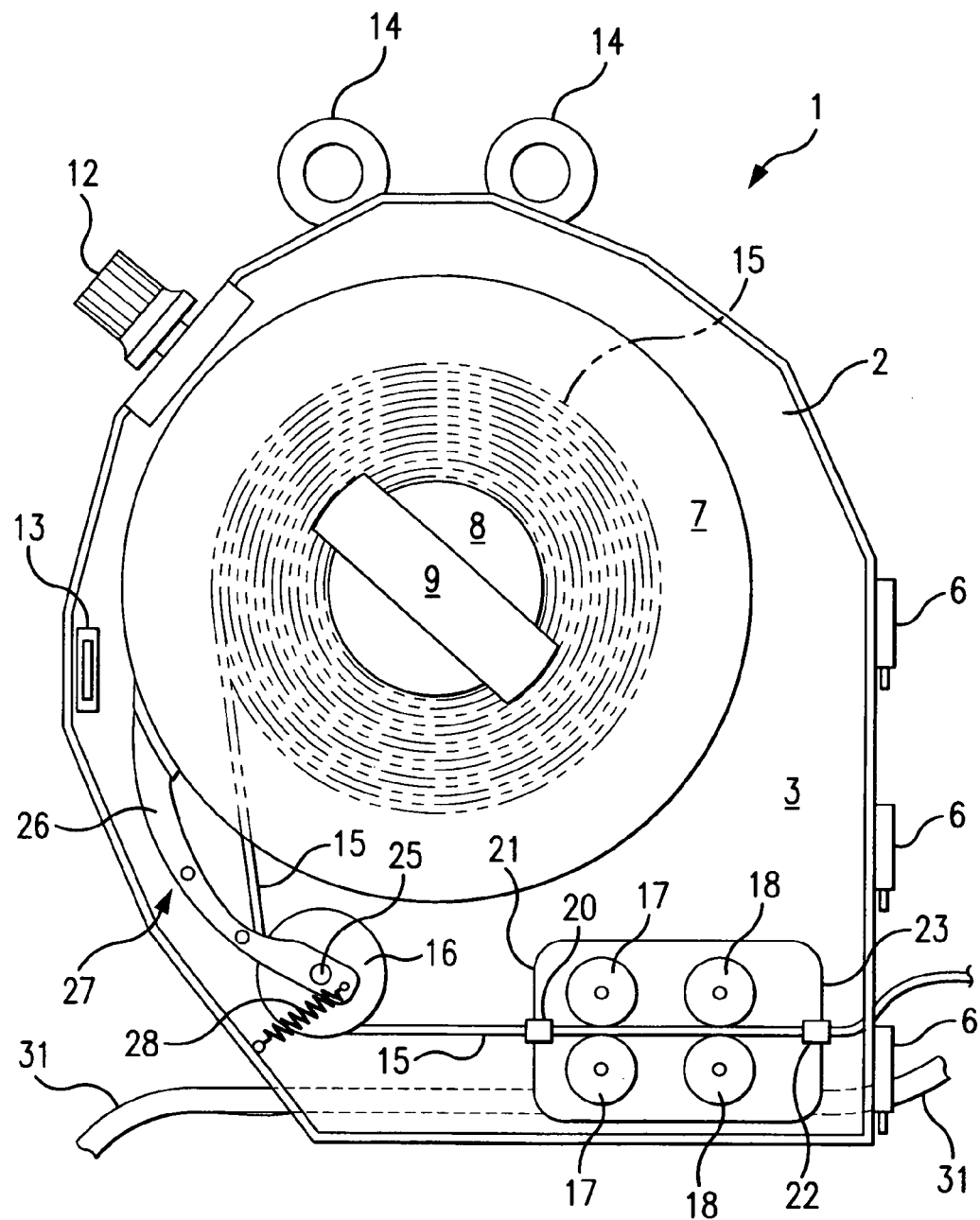
FIG. 1 is a full side view of a device of this invention.

Turning now to FIG. 1, which is a full side view of a device 1 of this invention, there is shown a housing 2 which is comprised of a front 3, a back 4, and a central wrap around side wall 5 joining the back 4. The front 3 is comprised of a hinged door held in place and moveable for opening by hinges 6. The number of hinges 6 is not critical, as long as they will hold the door in place and allow opening of the door without interference. The number of hinges 6 in FIG. 1 is shown as three. The shape of the housing 2 is also not critical.

Figure 2:
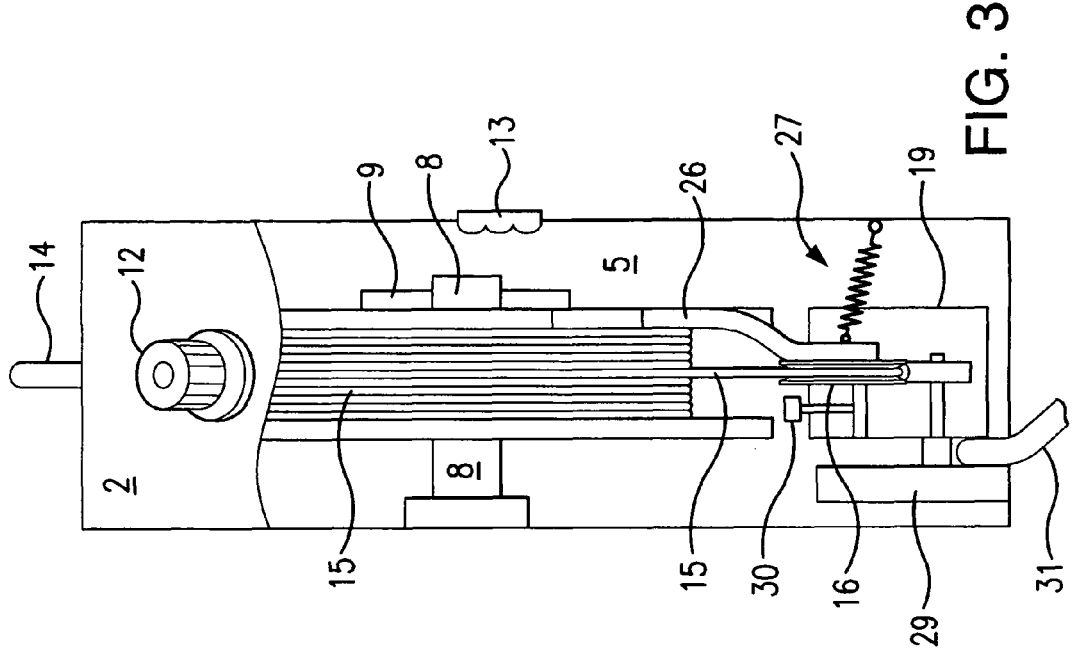
FIG. 2 is a full back view of a device of this invention.

The back 4 of the housing 2 is configured essentially according to the configuration of the front 3. The housing 2 is held together by attachment to the wrap around side wall 5 which is shown in FIG. 2.

There is a spool 7 that is supported on the back wall 4 by an axle assembly 8. There is a retainer 9 for the spool 7 on the axle 8.

There is a wire speed adjustment assembly 12 on the outside surface of the wrap around side wall 5 which controls the speed of any wire 15 (shown in phantom in FIG. 1) being unspooled from the spool 7.

There is a fastener 13 for the front door and two belt loop rings 14 for attachment to a workman's belt. This allows the workman to handle the device 1 and its wire without having to use his hands.

There is an in-line guide wheel 16 that gathers the wire 15 as it moves from the spool 7 and guides it into the drive wheels 17 and the idler wheels 18 in the drive wheel housing 19. There is a bushing 20 in the front wall 21 of the drive wheel housing 19 that accommodates the efficient transport of the wire 14 to the drive wheels 17 and the idler wheels 18. There is also a bushing 22 in the back wall 23 of the housing 19 to accommodate the transport of the wire 15 out of the back of the device 1.

The guide wheel 16 has rotatably attached to the axle 25, a brake 26, which extends to the edge surface of the spool 7 and provides a braking or snubbing action on the spool 7 such that the wire 15 does not unwind and snarl. The brake 25 has a tensioning device 27, which is comprised of a spring 28 that is attached to the brake 25 and the opposite end is attached to the wrap around side 2.

Figure 3:
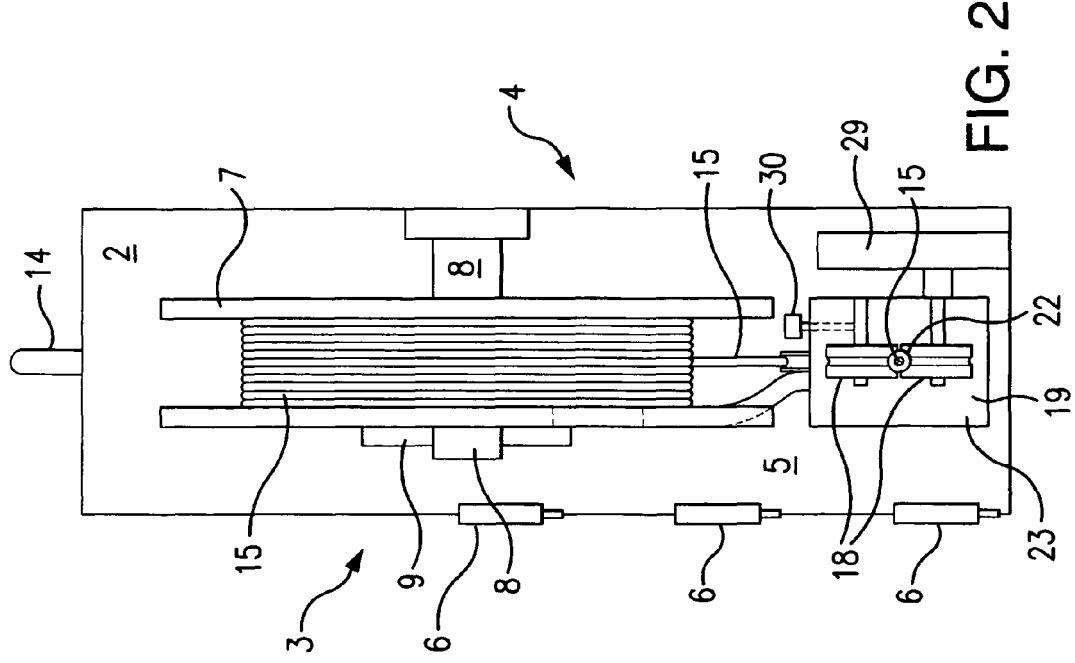
FIG. 3 is a full front view of a device of this invention.

Turning now to FIGS. 2 and 3, which are respectively, a full wraparound back side of the device 1 and a full wraparound front side view of the device 1, there is shown housing 2, the front 3, the back 4, the wrap around side 5, the hinges 6, the spool 7, the axle assembly 8, the retainer 9 for the spool 7, guide pins 10 for the spool 7, wire spool speed control 12, the fastener 13 for the front 3, the belt loop ring 14, the wire 15, the guide wheel 16, the idler wheels 18, the drive wheel housing 19, the bushing 22, in the back wall 23 of housing 19, and in addition, there is shown the motor 29 which drives the drive wheels 17. The designation 30 denotes a drive wheel tensioning device that allows for tensioning the drive wheels 17.

Shown in FIG. 1 is a portion of the power and gas supply assembly 31 that goes to the welding gun (not shown). This supply assembly contains the electrical power for the gun and also the inert gas supply that is required on such guns. The inert gases usually consist of a gas selected from the group consisting of argon, helium, and carbon dioxide.

The drive wheels 17 pull the wire 15 from the spool 7 and feed it through the idler wheels 18 and then through the bushing 22 and thence into the back end of a gun equipped to weld the wire into grooves and seams for work product to be welded.

What is claimed is:

1. A wire handling facilitator, said wire handling facilitator comprising:
   a. a housing having a front, a back, and a central wrap around side wall joining the back;
   b. said front being a hinged door;
   c. located and supported within the housing, a spool, said spool having a centered first axle having a distal end and a near end, said first axle being supported at said distal end by attachment to an inside back wall surface, said near end having detachedly attached thereto, a spool retainer;
   d. an alignment wheel mounted on a second axle, a distal end of said second axle being fixedly attached to said inside back wall surface;
   e. a brake pedal having a near end and a distal end, said near end having a first opening therein, said brake pedal being mounted on said second axle through said first opening, there being a second opening near said near end of said brake pedal, said second opening having a near end of a tension spring detachedly attached thereto, the opposite end of said tension spring being detachedly attached to said wire handling facilitator housing nearby;
   f. said alignment wheel being aligned to receive a wire from said spool in an outer groove of said alignment wheel;
   g. a wire drive puller and driver, said wire drive puller and driver comprised of a housing having a front wall and a back wall, there being a first opening in said front wall and a second opening in said back wall, each of said first opening and said second opening having a guide bushing inserted therein;
   h. there being a set of two drive rollers each having a centered axle, and an outside circumference, said set of drive rollers being vertically aligned with said alignment wheel and said drive rollers being vertically aligned with each other, said drive rollers in close proximity to each other at said respective outside circumferences, there being a means of controlling said drive roller tensions;
   i. there being a set of two idler rollers each having a centered axle and an outside circumference, said set of idler rollers being aligned with said alignment wheel and vertically aligned with each other, said idler rollers being in close proximity to each other at said outside circumferences;
   j. there being a means of controlling the speed of rotation of said drive rollers;
   k. there being a drive motor attached to said drive rollers for powering and driving said drive rollers.

2. A wire handling facilitator as claimed in claim 1 wherein, in addition, said wire handling facilitator has a means for attaching a carrier strap.

3. A wire handling facilitator as claimed in claim 1 wherein, in addition, said spool contains wire.

4. In combination, a wire handling facilitator as claimed in claim 1 and a wire welding torch for receiving said wire.

* * * * *